United States Patent Office 2,932,639
Patented Apr. 12, 1960

2,932,639

$\Delta^{1,4}$-16,17-OXIDO-PREGNADIENES

Eugene P. Oliveto, Bloomfield, and Hershel L. Herzog, Mountain View, N.J., assignors to Schering Corporation, Bloomfield, N.J., a corporation of New Jersey No Drawing. Application February 2, 1955
Serial No. 485,829

10 Claims. (Cl. 260—239.55)

Our invention relates to an improved process for the manufacture of compounds having cortical hormone properties.

More particularly, the invention relates to $\Delta^1$-dehydro derivatives of cortisone and of hydrocortisone and their esters, as described in the co-pending applications of Arthur Nobile, Serial No. 449,257, filed August 11, 1954, Serial No. 464,159, filed October 22, 1954, and Serial No. 481,279, filed January 11, 1955, now Patent No. 2,837,464.

These $\Delta^1$-dehydro derivatives of the known hormones and their esters have outstanding therapeutic properties, being several times more potent than the known hormones, while being more or less free from the undesirable side reactions of such hormones.

We have found that it is possible to convert the relatively cheap and readily available 16-dehydropregnenolone (I) and its esters, and likewise 16-dehydroprogesterone (III) into the highly active cortical hormone substances 1,4-pregnadiene-$11\beta,17\alpha,21$-triol-3,20-dione (the $\Delta^1$-dehydro derivative of compound F or hydrocortisone) and 1,4-pregnadiene-$17\alpha,21$-diol-3,11,20-trione (the $\Delta^1$-dehydro derivative of compound E or cortisone) and their esters, preferably their lower alkanoyl esters, which compounds are described and claimed in the above-mentioned co-pending applications, by a relatively small number of chemical and biochemical operations, by which new intermediate compounds are obtained. These operations include:

(a) Conversion of the 3-hydroxy-$\Delta^5$-system to the 3-keto-$\Delta^4$-system (in the case of 16-dehydro-pregnenolone);

(b) Introduction of a $17\alpha$-hydroxyl via the 16,17-epoxide;

(c) Introduction of a 21-hydroxyl group by the action of a member of the genus Ophiobolus, for example *O. herbotrichus* (Meystre et al., Helv., 37, 1548 (1954));

(d) Introduction of an $11\alpha$- or $11\beta$-hydroxyl group by the action of an appropriate microorganism (see United States patent to Murray et al., No. 2,602,769, and to Shull et al., No. 2,658,023);

(e) Introduction of the $\Delta^1$-double bond by means of *Corynebacterium simplex* (A.T.C.C. 6946) or similarly functioning other member of the family Corynebactriaceae and especially of the genus Corynebacterium, such as *Corynebacterium hoagii*, as described in the above-mentioned applications of Arthur Nobile.

The oxidation of the 3-hydroxyl group of 16-dehydro-pregnenolone (I) can be accomplished by the Oppenauer reaction or by careful oxidation with chromic oxide at room or below room temperature, but we prefer to effect such oxidation simultaneously with the introduction of the $\Delta^1$-double bond by treatment with a culture of a member of the family of Corynebactriaceae or with an enzymatic extract of such culture, as described more fully hereinbelow. If desired, esters, such as lower alkanoyl esters of 16-dehydropregnenolone can be used as starting material for this microbiological conversion. The introduction of the $17\alpha$-hydroxyl group can be effected by treatment with a per-acid, like perphthalic and perbenzoic acids, yielding the intermediate 16,17-epoxide. The latter is then preferably subjected to the action of hydogren iodide in admixture with acetic acid and acetic anhydride, yielding the 16-iodo-$17\alpha$-hydroxy compound. The iodine atom is then removed by refluxing the compound in solution in a lower aliphatic alcohol, like ethanol, and containing a small quantity of an organic acid, like acetic. acid, in the presence of Raney nickel catalyst. In this reaction the hydrogen adsorbed on the catalyst operates to replace the iodo group with hydrogen.

The 21-hydroxyl group is introduced by subjecting the 21-methyl compound to the action of a culture of a member of the genus Ophiobolus in known manner; while the mode of introduction of the $11\alpha$ or $11\beta$-hydroxyl is likewise accomplished in known manner as described in the above-mentioned patents. We have found that these hydroxyl groups can be introduced at the desired positions even in the case of 1,16- and 1,4-pregnadienes and of 1,4,16-pregnatrienes and without saturating any of the double bonds.

The dehydrogenating step whereby a double bond is introduced at the 1-position of the 10,13-dimethyl steroid molecule is accomplished by subjecting either the starting compound, or the intermediate obtained by one or more of the above-described conversions, to the action of a dehydrogenating member of the family Corynebactriaceae, and preferably of a member of the genus Corynebacterium. Satisfactory results have been obtained with *C. simplex* and *C. Hoagii*, of which the first is generally preferred. Cultures of *Corynebacterium simplex* are capable of introducing a $\Delta^1$-double bond even though the steroid molecule already contains a double bond at $C_{16}$ and also a double bond attached to $C_5$. The culture is capable not only of introducing a $\Delta^1$-double bond, but also of oxidizing a 3-hydroxyl group to a keto group with simultaneous shifting of a 5,6-double bond to the 4,5-position; and under certain conditions it can also effect oxidation of a 20-hydroxyl to a 20-keto group. Where the compound operated on has an ester group in the 3- or 21-positions, such ester group will be hydrolyzed, the hydrolycic of the $C_{21}$-ester group being favored by a pH of 6.8 to 7.1, and a temperature of about 26 to 29° C.

In order to obtain a desirable growth of *Corynebacterium simplex* (American Type Culture Collection 6946) for the process of this invention, a suitable nutrient medium is prepared containing carbohydrate, organic nitrogen, cofactors, and inorganic salts. It is possible to omit the use of carbohydrate without completely impairing the growth of the organism. The steroid compound as a solid or dissolved or suspended in ethanol, acetone or any other water-miscible solvent which is non-toxic toward the organism, is added to the cultivated microorganism in a broth medium under sterile conditions. This culture is then shaken, aerated or simultaneously aerated and agitated, in order to enhance the growth of the *Corynebacterium simplex* and the biochemical conversion of the steroid substrate. The steroid may be added to the broth medium and then inoculated with the bacterium, or the cultivated microorganism in broth medium may be added to the steroid. In certain cases, depending on the conditions of the reaction medium, it may be more desirable to obtain optimum growth of the microorganism before the addition of the steroid. Alternatively, enzyme preparations obtained in known manner from culture of *Corynebacterium simplex* may be used for carrying out the process.

A useful method for carrying out the process is the cultivation of *Corynebacterium simplex* on a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco), casein hydrolysate (N-Z-Amine) (Type B. Sheffield), corn steep liquor, water extract of soybean oil meal, lactalbumin hydrolysate (Edamine-Sheffield Enzymatic), fish solubles, and the like.

Inorganic salts are desirable to maintain a pH level in the reaction medium of between 6.8 and 7.2. However, the use of inorganic salts for buffering the reaction mixture may be omitted. The omission of inorganic salts causes the pH to rise from an initial value of 6.8 to about 7.7–8. This, however, will still permit the formation of the desired steroidal end products. The optimum temperature for growth of the selected microorganism is 37° C., but the temperatures may vary between 25° and 37°, and even between 20° and 40° C. The time of reaction may vary from as little as 3 hours to as much as 48 hours. The length of time which is employed will depend on the steroid which is being transformed. Any water miscible, non-toxic (to the organism) solvent may be employed to dissolve or suspend the steroid. We prefer to use thanol or acetone in such amounts that the final concentration of these solvents in the reaction mixture is no higher than about 7% and may amount to only traces; owing to evaporation, the final concentration of the organic solvent may even be practically zero.

Following the completion of the oxidation or dehydrogenation process, which may be accompanied by partial or complete hydrolysis when mono- or poly-esters are used, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones, and alcohols are useful. These include chloroform, methylene chloride, trichloroethane, ethylene dichloride, butanol, diethylketone, and others. We prefer to use extraction as the method for isolating the steroidal products. Following extraction, the products may be isolated by concentration of the extracts to a small volume or to dryness. Purification of the residues may then be accomplished in several ways. In many instances, as with the dienes of compound E and compound F, simple recrystallization from a suitable solvent or solvent mixture, such as acetone, methylene chloride, ethanol, acetone-hexane, methylene chloride-hexane, etc. affords the desired dienone in excellent yield and high state of purity.

While the lower alkanoic esters are generally preferred, and particularly the acetates, as above indicated, it will be understood that the specific character of the ester is not controlling in our process and that other esters, both of organic and inorganic acids may be employed, such as cyclopentyl and cyclohexyl acetates, propionates and butyrates, and also the phosphates, polyphosphates and sulfates, it being necessary only that the esters be non-toxic toward the microorganism. The hydroxylated products of our process can, if desired, be converted into their corresponding esters by known procedures, for example, into their lower alkanoic and particularly their acetic acid esters.

Where the ultimate product is to be $\Delta^1$-dehydrocortisone, we prefer to introduce an $11\alpha$ rather than an $11\beta$-hydroxyl group, as the $11\alpha$-hydroxyl can generally be more easily introduced and can then subsequently be oxidized to an 11-keto group. Where an $11\beta$-hydroxyl is introduced into the steroid molecule, such group may be retained unchanged in the final product to yield the $\Delta^1$-dehydro-derivative of hydrocortisone, which is likewise highly active.

The intermediates embraced by the present invention for the preparation of the $\Delta^1$-dehydro-derivatives of cortisone, hydrocortisone and other cortical hormones and their esters, have the following general formula:

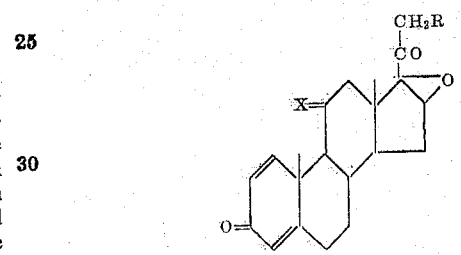

wherein X is $H_2$, O, or

while R stands for H, OH, or OAcyl, the acyl group in each case being that of an organic carboxylic acid, but preferably of a lower alkanoic acid, like formic, acetic, propionic, butyric, valeric and caproic acids, although other acids, like substituted alkanoic and aromatic acids, such as cyclohexyl acetic, cyclopentyl propionic, and benzoic acids, are not excluded.

Compounds in which X represents hydroxyl and R an acyl group are prepared by esterifying 16, 17-oxido-1,4,16-pregnatriene-11,21-diol-3,20-dione to obtain the 21-ester preliminarily to the oxidation of the 11-hydroxyl, after which the oxido ring is opened up with HI or HBr to form the 16,17-halohydrin; the halogen is then removed with Raney nickel or with hydrogen in the presence of palladium on charcoal catalyst. The hydrolysis of the 21-ester group can be effected at any time after the oxidation.

As already indicated, the several steps involved in our process can be conducted in various sequences, a number of which are indicated in the following scheme:

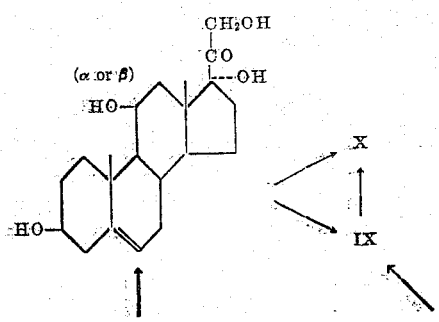

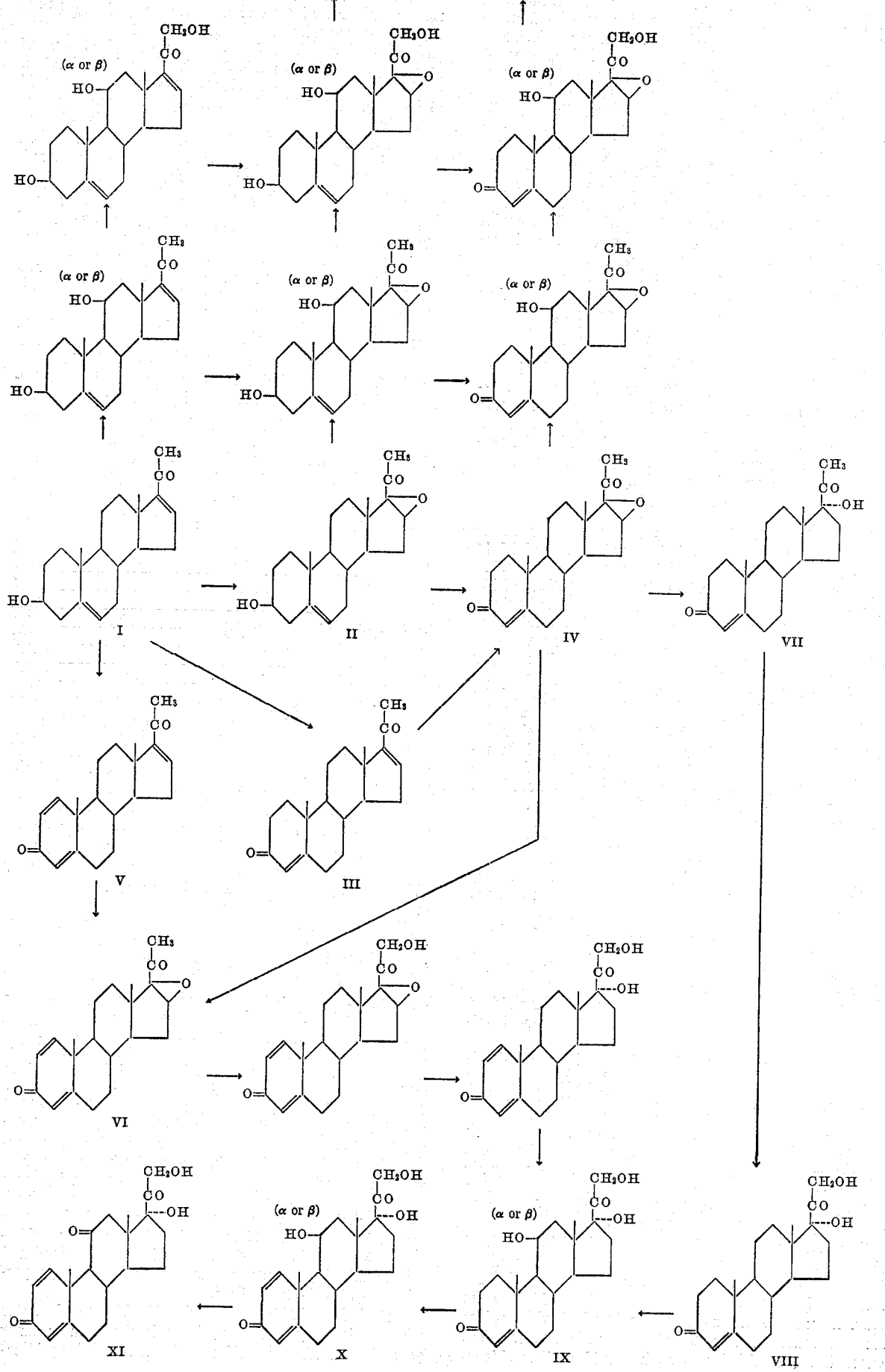

Most of these steps are completely independent of each other, so that the sequence of operations may be successfully changed in a variety of ways. For example, compound I may first be converted to 16,17-oxidopregnenolone II, and then to 16,17-oxidoprogesterone (IV), or it can be converted to 16-dehydroprogesterone (III), and thence to IV. Any of these known intermediates (I, II, III, IV) may be hydroxylated at position 11, (either $\alpha$ or $\beta$) and at position 21, and converted to the 3-keto-$\Delta^{1,4}$-diene system, and these three sequences can be done in any order. The products derived from I and III, and still containing a $\Delta^{16}$-double bond, can then be converted to the 16,17-epoxide by the usual procedures (either with per-acids or alkaline hydrogen peroxide). The introduction of the $\Delta^1$-double bond can also be done at any time, for example on the 3-hydroxy-$\Delta^5$-system (I→V) or on the 3-keto-$\Delta^4$-system (IV→VI) regardless of whether the hydroxylation steps have been carried out.

It also does not matter at what point in the process the 16,17-epoxide is opened by means of HI to give the 17$\alpha$-hydroxyl group, or at what point the 11-hydroxyl is oxidized to the 11-ketone, provided that during these reactions any hyroxyls present at 3 and 21 are protected by ester groups which can be subsequently be removed.

The following examples are indicative of the transformations which may be carried out, and their various sequences pursuant to the invention.

*Example 1*

One hundred ml. of a 0.1% yeast extract concentrate including 9.0 ml. of 0.2 M $KH_2PO_4$ and 9.0 ml. of 0.2 M $Na_2HPO_4$ were sterilized and inoculated with a 1.0% suspension of *Corynebacterium simplex* (A.T.C.C. 6946) from a 24-hour broth culture. The newly seeded culture was incubated and shaken on a shake table for 20 hours at 28° C. After incubation, the broth culture was transferred aseptically to a second sterile 300 ml. Erlenmeyer flask containing 150.0 mg. of sterile 16-dehydroprogesterone in 5.0 ml. of ethanol or acetone. The pH of the reaction mixture was 7.0. The bacterial culture containing the steroid and solvent was incubated and shaken for a period of 48 hours a+ 28° C. The final pH of the reaction mixture was 7.2–7.4. The culture was then extracted thoroughly with three portions of chloroform. The extracts were pooled and concentrated in a steam bath to dryness. The crude extract weighed 150 mg.

The crude product was crystallized from acetone-hexane to give $\Delta^{1,4,16}$-pregnatriene-3,20-dione.

The 11$\alpha$-hydroxylation of steroids has been amply described using *Rhizopus nigricans* (J.Am. Chem. Soc., 74, 5933 (1952)). To 10 liters of a 24-hour growth culture of *Rhizopus nigricans* is added 2.0 g. of $\Delta^{1,4,16}$-pregnatriene-3,20-dione in 300 ml. of ethanol. After a 48-hour transformation period, the mixture is extracted with methylene chloride, and the organic extract evaporated to dryness. The crude product is crystallized from acetone-hexane to give $\Delta^{1,4,16}$-pregnatrien-11$\alpha$-ol-3,20-dione.

A solution of 1.5 g. of $\Delta^{1,4,16}$-pregnatrien-11$\alpha$-ol-3,20-dione in 10 ml. of pyridine was added slowly to a slurry of 1 g. of chromium trioxide in 10 ml. of pyridine, and the mixture stirred overnight at room temperature. A solution of 3 g. of sodium sulfite in 30 ml. of water was added, stirring continued 2 hours, water added and the mixture extracted with methylene chloride. The organic extract was washed neutral, dried and evaporated. The crude product was crystallized from acetone-hexane to give $\Delta^{1,4,16}$-pregnatriene-3,11,20-trione.

One g. of the pregnatriene was dissolved in 25 ml. of chloroform and reacted at room temperature for about 15 hours with the equivalent amount of perbenzoic acid dissolved in chloroform. Water was then added to the reaction mixture, the organic layer washed with sodium sulfite solution, then with sodium bicarbonate solution, water, and then dried over sodium sulfite. The chloroform was evaporated and the residue was crystallized from a mixture of acetone and hexane, yielding 16,17-epoxy-1,4-pregnadiene-3,11,20-trione.

A suspension of 1 g. of the 16,17-epoxide in 10 ml. of glacial acetic acid was mixed with a solution of 1.1 g. of 47% aqueous hydrogen iodide, 10 ml. of acetic acid and 4.1 g. of acetic anhydride. The temperature was maintained at about 15 to 20° C. throughout the addition and for a half hour afterwards. The mixture was then poured into five volumes of water, the precipitate filtered, washed with water and dried. The crude product, 16-iodo-1,4-pregnadiene-17$\alpha$-ol-3,11,20-trione, weighed 1.42 g. The iodo compound was dissolved in 100 ml. of ethanol and 1 ml. of acetic acid and refluxed for about 6 hours with 2.5 g. of Raney nickel catalyst. The catalyst was then removed by filtration, the filtrate concentrated, and upon the adidtion of water there was obtained a precipitate of 1,4-pregnadien-17$\alpha$-ol-3,11,20-trione.

This product was then converted to the corresponding 21-hydroxy derivative by subjecting it to the action of a culture of *Ophiobolus herbotrichus*, as described in Example 2, to yield the $\Delta^1$-derivative of cortisone (1,4-pregnadiene-17$\alpha$,21-diol-3,11,20-trione).

*Example 2*

A culture of *Curvularia lunata* (QM 120h) was grown in flasks containing the same medium described in Example 1 (U.S. 2,658,023). One hundred milliliters of this inoculum were added under sterile conditions to two liters of the following medium:

| | Percent |
|---|---|
| Sucrose | 1 |
| "Difco" tryptone | 1 |
| Sodium nitrate | 0.2 |
| Dipotassium hydrogen phosphate | 0.1 |
| Magnesium sulfate heptahydrate | 0.05 |
| Potassium chloride | 0.05 |
| Ferrous sulfate heptahydrate | 0.001 |

This mixture was adjusted to pH 7 with sulfuric acid and 0.25% of calcium carbonate was added before the mixture was sterilized. The inoculated medium was aerated at the rate of about one-half to one volume of air per volume of solution per minute at 27° to 28° C. for 24 hours. During this time the mixture was stirred at the rate of about 1700 revolutions per minute. One-half gram of $\Delta^{1,4,16}$-pregnatriene-3,20-dione was dissolved in 20 milliliters of 95% ethanol. The solution was added to the fermentation mixture under sterile conditions. The reaction was then continued for a further 24 hours under the same conditions as described above.

The fermentation mixture was extracted thoroughly with several portions of methylene chloride, the organic extracts dried, concentrated, and chromatographed on Florisil. The 10–50% ether fractions were combined and crystallized from acetone-hexane to give $\Delta^{1,4,16}$-pregnatrien-11$\beta$-ol-3,20-dione.

Four liters of 1% yeast extract (Difco) was sterilized in a shake flask and inoculated with a strain of *Ophiobolus herbotrichus*. The culture was incubated for three days with shaking at 27° C. Then 1.0 g. of $\Delta^{1,4,16}$-pregnatrien-11$\beta$-ol-3,20-dione in 25 ml. of acetone (sterile) was added aseptically to the shake flask and shaking continued for another three days at 27° C. The mycelium was separated from the reaction mixture and both the mycelium and aqueous filtrate were extracted thoroughly with three portions of chloroform. The extracts were combined, washed with water, dried, concentrated, and chromatographed on Florisil. The material obtained with 0.5%–1.5% methanol in methylene chloride was combined and crystallized from acetone-hexane to give $\Delta^{1,4,16}$-pregnatriene-11$\beta$,21-diol-3,20-dione.

Acetylation of $\Delta^{1,4,16}$-pregnatrien-11$\beta$,21-diol-3,20-dione with acetic anhydride in pyridine in the usual manner gave the 21-acetate; oxidation by means of pyridine-chromium trioxide as in Example 1 gave $\Delta^{1,4,16}$-pregnatrien-21-ol-3,11,20-trione 21-acetate. Hydrolysis was accomplished by refluxing for 1 hour with an equal weight of potassium carbonate in aqueous methanol. The product obtained after removal of the methanol was $\Delta^{1,4,16}$-pregnatrien-21-ol-3,11,20-trione.

The pregnatriene compound is then converted to the 16,17-epoxide, and the epoxide structure replaced by a 17α-hydroxyl in the manner described in Example 1 to yield the $\Delta^1$-dehydro derivative of cortisone.

Example 3

A solution of 1.0 g. of 1,4,16-pregnatrien-11α-ol-3,20-dione (obtainable as described in Example 1) in 25 ml. of chloroform was allowed to react at room temperature overnight with one equivalent of perbenzoic acid in chloroform. Water was added, the organic layer washed with sodium sulfite solution, sodium bicarbonate solution, water, then dried over sodium sulfate. Evaporation of the chloroform, followed by crystallization from acetone-hexane, gave 16,17-epoxy-1,4-pregnadien-11α-ol-3,20-dione.

A solution of 1.0 g. of 16,17-epoxy-1,4-pregnadien-11α-ol-3,20-dione in 5 ml. of acetic acid was treated at 0° for 2 hours with a solution of 0.3 g. of chromium trioxide in 5 ml. of acetic acid. The acetic acid was then carefully neutralized below 20° by the addition of 10% sodium hydroxide, the mixture extracted with chloroform and the organic extract washed with water, dried and evaporated. Crystallization from acetone-hexane gave 16,17-epoxy-$\Delta^{1,4}$-pregnadiene-3,11,20-trione.

The epoxy compound was then treated in the same manner as in Example 1 to open up the oxide ring and introduce a 17α-hydroxy group, whereby there was obtained 1,4-pregnadien-17α-ol-3,11,20-trione. Treatment with a culture of *Ophiobolus herbotrichus*, as in Example 2, gave the corresponding 21-hydroxy compound ($\Delta^1$-dehydrocortisone).

Example 4

In the manner described in Example 3, 1,4,16-pregnatrien-11β-ol-3,20-dione (obtainable as described in Example 2) was converted to 16,17-epoxy-1,4-pregnadien-11β-ol-3,20-dione, using one equivalent of perphthalic acid in chloroform, and the epoxy compound then converted into 1,4-pregnadiene-11β,17α-diol-3,20-dione. This compound was then subjected to fermentation in a culture of *Ophiobolus herbotrichus*, as in Example 2, and yielded, 1,4-pregnadiene-11β,17α,21-triol-3,20-dione ($\Delta^1$-dehydrohydrocortisone).

Example 5

1,4,16-pregnatriene-11β,21-diol-3,20-dione was first converted to its 21-monoacetate by means of acetic anhydride in pyridine, then oxidized with perbenzoic acid as in Example 3, to give 16,17-epoxy-1,4-pregnadiene-11β,21-diol-3,20-dione 21-acetate. Oxidation with chromium trioxide-pyridine as in Example 1, gave 16,17-epoxy-1,4-pregnadien-21-ol-3,11,20-trione 21-acetate. Hydrolysis of the last-named compound was accomplished by refluxing in aqueous methanolic potassium carbonate for 30 minutes to give 16,17-epoxy-1,4-pregnadiene-21-ol-3,11,20-trione. This intermediate was then treated as described in Example 1 to open up to epoxide ring and simultaneously introduce a 17α-hydroxyl to produce 1,4-pregnadiene-17α,21-diol-3,11,20-trione ($\Delta^1$-dehydrocortisone).

Example 6

The 16,17-epoxy-1,4-pregnadiene-11β,21-diol-3,20-dione 21-acetate, obtained as described in Example 5, was after hydrolysis of the ester group, subjected to the treatment described in Example 1 for opening up the epoxide ring and substituting a 17α-hydroxy group, there being then obtained the 1,4-pregnadiene-11β,17α,21-triol-3,20-dione ($\Delta^1$-dehydrohydrocortisone).

Example 7

In the manner described in Example 3, 1,4,16-pregnatriene-3,20-dione was converted to 16,17-epoxy-1,4-pregnadiene-3,20-dione. The latter was then treated as in Example 1, to replace the oxide ring with a 17α-hydroxy group, and yielded 1,4-pregnadiene-17α-ol-3,20-dione. This compound was then treated as above described, to introduce an 11β-hydroxyl and a 21-hydroxyl and gave the $\Delta^1$-derivative of hydrocortisone.

Example 8

Reaction of 1,4,16-pregnatrien-11α-ol-3,20-dione with *Ophiobolus herbotrichus*, as described in Example 2, gave 1,4,16-pregnatrien-11α,21-diol-3,20-dione. This compound was then treated as described in Example 3, with perbenzoic acid to give 16,17-epoxy-1,4-pregnadiene-11α,21-diol-3,20-dione which in turn was treated as described in Example 1, to replace the epoxide ring with a 17α-hydroxy group, thereby yielding 1,4-pregnadiene-11α,17α,21-triol-3,20-dione. After acetylation of the 21-hydroxyl group, the 11α-hydroxy group was oxidized to a keto group with chromic acid, yielding the $\Delta^1$-derivative of cortisone-acetate.

Example 9

To a suspension of 2.0 g. of 16,17-epoxy-1,4-pregnadien-11α-ol-3,20-dione in 20 ml. of glacial acetic acid was added with stirring a solution of 2.2 g. of 47% aqueous hydrogen iodide, 20 ml. of acetic acid and 8.2 g. of acetic anhydride. The reaction temperature was maintained at 15–20° throughout the addition and for a half-hour afterwards. The mixture was poured into 5 volumes of water, and the precipitate filtered, washed with water and dried. The weight of product, 16-iodo-1,4-pregnadiene-11α,17α-diol-3,20-dione 11-acetate, was 2.8 g. This was dissolved in 200 ml. of ethanol and 2 ml. of acetic acid, and refluxed 6 hours with 5 g. of Raney nickel catalyst. The catalyst was removed by filtration, the filtrate concentrated, and water added to give 1,4-pregnadiene-11α,17α-diol-3,20-dione 11-acetate. The 11-acetate could be removed in the usual manner by refluxing with an equal weight of potassium carbonate in aqueous methanol for 1 hour; the product obtained was 1,4-pregnadiene-11α,17α-diol-3,20-dione. This was then treated with chromic oxide to replace the 11α-hydroxyl with a keto group and with a culture of *Ophiobolus herbotrichus*, as above described, to introduce a hydroxyl group at the 21-position to give 1,4-pregnadiene-17α,21-diol-3,11,20-trione.

Example 10

5,16-pregnadiene-3β,21-diol-20-one diacetate (Djerassi and Lenk, J. Am. Chem. Soc., 76, 1722 (1954)) upon treatment with *Corynebacterium simplex* in the manner described in Example 1, was converted to 1,4,16-pregnatrien-21-ol-3,20-dione. This was then converted to 16,17-epoxide by treatment with perphthalic acid, as above described, which in turn was converted to 1,4-pregnadiene-17α,21-diol-3,20-dione by treatment with hydriodic acid followed by refluxing in a solvent with Raney nickel catalyst.

As will be evident from the above examples, the various treatments of the original starting compounds (16-dehydropregnenolone or 16-dehydroprogesterone) can be conducted in any order, except that the oxidation of the 11α or 11β-hydroxyl group must necessarily be subsequent to the introduction of such hydroxyl group.

With reference to the starting compound of Example 10, such compound is prepared by treating 16-dehydropregnenolone with a culture of *Ophiobolus herbotrichus* to yield 5,16-pregnadiene-3,21-diol-20-one which is then acetylated in known manner to produce the diacetate.

In place of the per-acids, like peracetic, perbenzoic, and perphthalic acids for the formation of the oxido ring, there may be employed hydrogen peroxide, together with an alkali metal base, preferably sodium or potassium hydroxide. This mixture may contain a quantity of an alcohol, like methanol and t-butanol, to aid in dissolving the steroid compound, but such alcohol is generally not absolutely necessary.

As will be obvious from the foregoing, the several reactions described can be carried out in various sequences, and that, for example, compounds of the type 4,16-pregnadiene-3,20-dione, 5,16-pregnadiene-3-ol-20-one and its 3-esters, 5,16-pregnadiene-3,11-diol-20-one and its 3-esters, 5,16-pregnadiene-3,21-diol-20-one and its 3- and 21-esters, 5,16-pregnadiene-3,11,21-triol-20-one and its 3- and 21-esters, 4,16-pregnadiene-3,11,20-trione, and 4,16-pregnadiene-21-ol-3,11,20-trione and its 21-esters, can be subjected to the culture of a dehydrogenating member of the family Corynebactriaceae, and preferably of the genus Corynebacterium, to form the conjugated 3-keto-1,4-diene system, and to the action of a per-acid, or of hydrogen peroxide, to form the 16,17-oxido ring, in either order.

It will also be apparent that the keto group in the 3- and/or 20-positions can be intermediately protected by conversion into acetal groups, or by condensation with ketone reagents, like semicarbazide, thiosemicarbazide, phenyl hydrazine, and the like in known manner, or temporarily converted into other groups, from all of which the keto group or groups can be regenerated by hydrolysis or otherwise, should it be desired to prevent action by any reagent on such keto groups during the course of the process above described or in obvious variations thereof.

Where the culture of a microörganism is referred to hereinabove and in the claims, it will be understood that the separated enzyme or enzymes of the culture can be used in place of the whole culture.

We claim:
1. Compounds of the formula

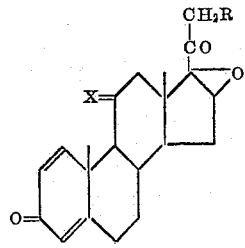

wherein X is a member of the group consisting of $H_2$, O

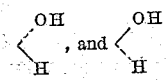

and R is a member of the group consisting of H, OH, and OR', R' being lower alkanoyl.

2. 16,17-oxido-1,4-pregnadiene-3,20-dione.
3. 16,17-oxido-1,4-pregnadiene-21-ol-3,30-dione.
4. 16,17-oxido-1,4-pregnadiene-3,11,20-trione.
5. 16,17-oxido-1,4-pregnadiene-21-ol-3,11,20-trione.
6. 16,17-oxido-1,4-pregnadiene-11,21-diol-3,20-dione.
7. 16,17-oxido-1,4-pregnadiene-11α,21-diol-3,20-dione.
8. 16,17-oxido-1,4-pregnadiene-11β,21-diol-3,20-dione.
9. 16,17-oxido-1,4-pregnadiene-11-ol-3,20-dione.
10. Lower alkanoyl esters of 16,17-oxido-1,4-pregnadiene-21-ol-3,20-dione.

References Cited in the file of this patent
UNITED STATES PATENTS

| | | |
|---|---|---|
| 2,649,401 | Haines | Aug. 18, 1953 |
| 2,673,847 | Spero | Mar. 30, 1954 |
| 2,695,260 | Murray | Nov. 23, 1954 |
| 2,684,364 | Jones | July 20, 1954 |
| 2,752,339 | Julian | June 26, 1956 |
| 2,756,179 | Fried | July 24, 1956 |
| 2,767,199 | Djerassi | Oct. 16, 1956 |
| 2,837,464 | Nobile | June 26, 1958 |